(12) United States Patent　　(10) Patent No.:　US 8,302,371 B2
MacGuinness　　(45) Date of Patent:　Nov. 6, 2012

(54) HORSE BLANKET ALLOWING FREER MOVEMENT OF A HORSE IN USE

(76) Inventor: Thomas Peter MacGuinness, Dromiskin (IE)

(*) Notice: Subject to any disclaimer, the term of this patent is extended or adjusted under 35 U.S.C. 154(b) by 0 days.

(21) Appl. No.: 13/014,356

(22) Filed: Jan. 26, 2011

(65) Prior Publication Data

US 2011/0185688 A1　Aug. 4, 2011

(30) Foreign Application Priority Data

Jan. 29, 2010　(IE) .................................. 2010/0048

(51) Int. Cl.
  *B68C 5/00*　(2006.01)
(52) U.S. Cl. ......................................... 54/79.2; 54/79.1
(58) Field of Classification Search .......... 54/79.1–79.4; 119/850
See application file for complete search history.

(56) References Cited

U.S. PATENT DOCUMENTS

| | | | | |
|---|---|---|---|---|
| 6,237,310 B1* | 5/2001 | MacGuinness | ................ | 54/79.2 |
| D526,451 S * | 8/2006 | Ainge | .......................... | D30/145 |
| 7,310,927 B1* | 12/2007 | Hathcock et al. | .............. | 54/79.3 |
| 7,320,207 B2* | 1/2008 | Kwan | ............................. | 54/79.1 |
| 2005/0066631 A1* | 3/2005 | MacGuinness | ................ | 54/79.2 |
| 2008/0216454 A1* | 9/2008 | Lacow et al. | .................. | 54/79.2 |

* cited by examiner

*Primary Examiner* — Rob Swiatek
*Assistant Examiner* — Lisa Tsang
(74) *Attorney, Agent, or Firm* — Birch, Stewart, Kolasch & Birch, LLP.

(57) ABSTRACT

A horse blanket allowing freer movement of a horse in use, comprising a generally rectangular piece of material with a front edge, a rear edge and two side edges. The blanket is split, from each side edge to the center line thereof, into a front section and a rear section, the front and rear sections being connected together at the center line of the blanket to define a flexible joint therebetween, about which the blanket articulates. The flexible joint extends to a position to each side of the center line. The flexible joint is positioned, in use, at a location to the rear of the horse's withers where the pommel of a saddle would be properly positioned. The articulation of the blanket about the flexible joint facilitates up and down movements, side to side movements, as well as twisting movements of the front section relative to the rear section in response to movements of the horse.

11 Claims, 8 Drawing Sheets

HORSE BLANKET ALLOWING FREER MOVEMENT OF A HORSE IN USE

The present invention relates to horse blankets and, in particular, to a horse blanket of the type which allows freer movement of a horse in use.

FIELD OF THE INVENTION

The present invention is directed to a horse blanket, which addresses the problem of the restriction of the normal bending movements of the horse's body, when worn.

BACKGROUND OF THE INVENTION

There are a wide variety of shapes and styles of horse blankets or rugs known from the prior art. The choice of a particular type or style of blanket may be affected by a number of variables, including the size of horse, the climate in which the blanket will be worn, whether the horse will spend the majority of its time indoors or outdoors and the length of time for which the blanket will be worn. There is great variation in size of horse blankets ranging from very small, light-weight summer sheets and indoor sheets to quartersheets used to keep a race horse warm while it cools down after exercise, to turnout rugs which are one of the largest of all types of horse blanket. Turnout rugs are used to protect a horse in cold climates and poor weather conditions and to prevent a horse from losing condition as a result of expending large amounts of energy keeping itself warm.

One of the main problems associated with turnout rugs and blankets of similar size and so-called depth is that the horse is prevented from moving freely when the blanket or rug is tightened underneath the belly. The portions of the blanket or rug which are drawn across the legs, when the securing means situated between the forelegs and hind legs on opposite edges of the blanket or rug are closed, are pulled taut when the horse extends its legs. This prevents the horse from moving its legs freely, which can cause friction-related injuries to the affected areas when the horse exercises or when the blanket or rug is worn for an extended period of time. The injuries caused in these instances affect very sensitive regions of the body of a horse, and it is quite common for these areas to become infected. In the case of a working horse this can lead to long periods of inactivity while the wounds heal, as it is recommended not to tack up a horse if the tack will come into contact with the affected areas.

In a similar fashion, serious friction related injuries to a show horse prevent an owner from showing the horse competitively, which can lead to long periods of inactivity for the horse and resultant loss of condition due to lack of exercise and lack of grooming while the wounds heal.

As well as restricting leg movements the blankets also tend to restrict the normal movements of the horse's body, which can result in discomfort for the horse in the neck and back areas. Each vertebra in the spinal column of a horse can rotate in three planes and this causes three kinds of movement of the spine: extension/flexion, lateral bending and axial rotation.

In the following description, the alternative terms "blanket" and "rug" are referred to by the single term "blanket".

A horse blanket is known which incorporates a shoulder gusset, which affords the forelegs of a horse a greater degree of movement to that afforded by a blanket without such a structure. The extra material incorporated in the shoulder gusset unfolds to accommodate the movement of the horse and there is consequently less resistance to the movement of the legs when the blanket has been secured and tightened, compared to a blanket without this feature. However, such a gusset does not eliminate the possibility of friction-related injuries occurring, and there is still the likelihood of the blanket material becoming trapped between the horse's inner legs and its body when the horse moves.

A horse blanket is described in Australian Patent No. 553401 which incorporates a shoulder opening covered by loose flaps which is configured to form kick pleats. The kick pleats allow for the natural forward thrust of the shoulder as the horse moves.

However, this blanket is not suitable for cold climates as the shoulder openings result in exposure of the horse's shoulder area to the elements.

Furthermore, this design of blanket does not address the problem of the restriction of the normal bending movements of the horse's body as described above.

European Patent No. 1 469 718 B1 describes a blanket having cut-outs in the side edges thereof, which are positioned over the horse's legs in the square halt position. The cut-outs allow lengthwise extension of the blanket when the horse extends its legs and prevent gathering of the blanket between the inner leg and the body of the horse during the reverse movement of the legs. This arrangement prevents the likelihood of friction-related injuries caused by the wearing of the blanket, particularly in the area between the inner leg and the body of the horse and also in the shoulder area.

However, this design of blanket does not address the problem of the restriction of the normal bending movements of the horse's body as described above.

It is an object of the present invention to provide a horse blanket which overcomes the disadvantages of the aforementioned blankets.

SUMMARY OF THE INVENTION

Thus, the invention provides a horse blanket allowing freer movement of a horse in use, the blanket comprising a generally rectangular piece of material with a front edge, a rear edge and two side edges, the blanket being split, from each side edge to the centre line thereof, into a front section and a rear section, the front and rear sections being connected together at the centre line of the blanket to define a flexible joint therebetween, about which the blanket articulates, the flexible joint being positioned, in use, at a location to the rear of the horse's withers and between 2 to 6 cm behind where the pommel of a saddle would be properly positioned, such that the front section and the rear sections can move relative to one another about the flexible joint in response to movements of the horse.

DETAILED DESCRIPTION OF THE INVENTION

As noted above, the invention provides a horse blanket allowing freer movement of a horse in use, the blanket comprising a generally rectangular piece of material with a front edge, a rear edge and two side edges, the blanket being split, from each side edge to the centre line thereof, into a front section and a rear section, the front and rear sections being connected together at the centre line of the blanket to define a flexible joint therebetween, about which the blanket articulates, the flexible joint being positioned, in use, at a location to the rear of the horse's withers and between 2 to 6 cm behind where the pommel of a saddle would be properly positioned, such that the front section and the rear sections can move relative to one another about the flexible joint in response to movements of the horse.

By the phrase "at a location to the rear of the horse's withers and between 2 to 6 cm behind where the pommel of a saddle would be properly positioned" in this context is meant, in the case of an English saddle, a position of between 14 to 19 cm behind the withers.

An advantage of the blanket in accordance with the invention is that the front section and the rear section can move independently of one another about the flexible joint, thus allowing freer movement of the horse. The flexible joint joins the front section and the rear section together such that the blanket performs as an articulated, two-piece unit, which is movable about the flexible joint.

In movement the back of the horse, from the withers to the croup, does not bend very much, whereas, in contrast, there is a lot of movement of the neck and shoulder areas. The movements of the horse which are accommodated by the blanket in accordance with the invention include, for example, lateral bending movements, stretching movements, where both forelegs are moved forward at the same time, such as when the horse bucks or prances, and movements where the horse throws up its head and neck, and movements resulting from axial rotation of the vertebral column. Thus, the blanket allows free movement of the neck and shoulders relative to the backbone of the horse to the rear of the withers, while the blanket remains securely in place.

Preferably, the flexible joint extends to a position to each side of the centre line in the range of between 10 to 40 cm therefrom.

The ideal distance that the flexible joint extends to each side of the centre line depends on the size of a particular blanket. For a particular blanket size the shorter the distance is the better, when considering the freedom of movement of the horse. However, the strength of the flexible joint has to be also considered and a compromise reached.

Further, preferably, the position to each side of the centre line lies behind the scapula of the horse in use.

It has been found that a distance from the centre line within this range offers the best compromise between freedom of movement for the horse and the strength of the blanket.

In one embodiment of the invention the front and rear sections, on each side of the blanket, are connected by a loose piece of material between the position to each side of the centre line and the side edge of the blanket, the dimensions of the loose piece of material being such that any relative movement of the front and rear sections is not impeded.

Positioning a loose piece of material in such a way has been found to be the most comfortable position for the horse. The front section and the rear section meet along the line of a standard girth to the rear of the scapula.

Preferably, each loose piece of material is in the form of an inverted pleat.

An inverted pleat arrangement results in a neat side to the blanket with the additional material of the pleat remaining hidden from view in the closed position.

Further, preferably, each inverted pleat is triangular and tapers from the side edge to the point adjacent the centre line.

A pleat of this shape allows lengthwise extension of the blanket to a greater extent as one moves from the centre line to the side edge. Thus, the blanket remains neatly draped over the centre line and may be extended most at the level of the side edge.

Further, preferably, one side of the triangular inverted pleat is attached to the rear section and is generally perpendicular to the side edge of the blanket, the other side of the triangular inverted pleat is attached to the front section and in use is movable away from the side attached to the rear section to provide lengthwise extension of the blanket.

In a further embodiment of the invention, the front section to each side of the blanket below the flexible joint overlaps the rear section, or vice versa.

An advantage of this arrangement is the simplicity of construction. The front section is cut so as to overlap the rear section or vice versa and no additional material is required to bridge the gap between the front and rear sections.

Such a blanket would be suitable for use in mild climates not subject to very cold or windy conditions.

In a further embodiment of the invention, the rear section is wrappable under the belly of the horse and is secured thereunder by a plurality of surcingles.

An advantage of this arrangement is that the rear section will move with the movements of the rear of the horse while remaining securely in place.

In a further embodiment of the invention, the side edges are stepped such that the rear section extends further from the centre line than the front section.

An advantage of this arrangement is that the length of the rear section can by varied to accommodate horses of differing girths.

In a further embodiment of the invention, the front and rear sections are manufactured separately and are subsequently joined together to form the flexible joint.

By constructing the blanket from two separate sections variations in the lengths of the front and rear sections can be more easily accommodated. Thus, for a particular height of horse the length of the front section will not need to be varied, and with the two section construction this front section can be matched to rear sections of differing lengths. To achieve this result from a one piece construction would require multiple patterns for each height of horse, thus increasing production costs.

Figure 1:
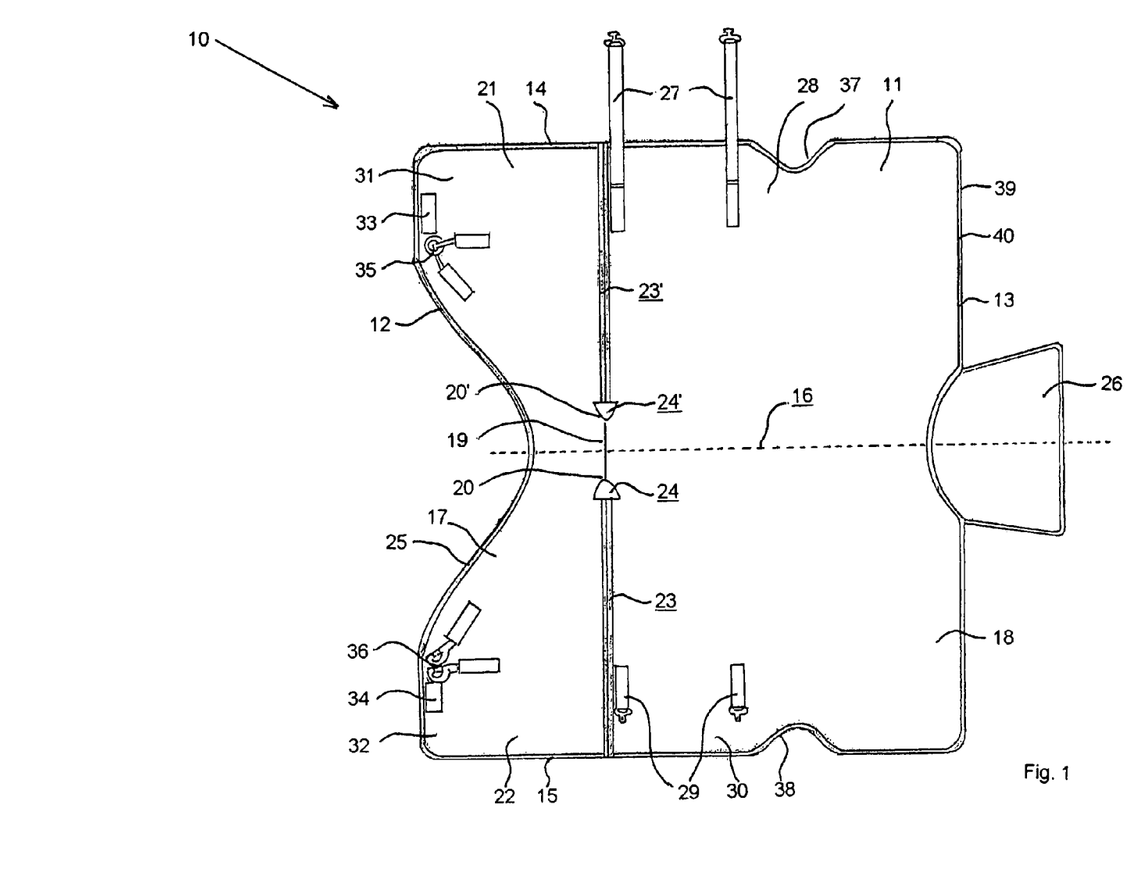
FIG. 1 is a plan view, from above, of a horse blanket according to the invention.

The invention will be further illustrated by the following description of an embodiment thereof, given by way of example only with reference to the accompanying drawings in which:

Referring to FIG. 1, there is illustrated, generally at 10, a horse blanket allowing freer movement of a horse in use, the blanket 10 comprising a generally rectangular piece of material 11 with a front edge 12, a rear edge 13 and two side edges 14, 15. The blanket 10 is split, from each side edge 14, 15 to the centre line 16 (shown as a dashed line) thereof, into a front section 17 and a rear section 18, the front and rear sections 17, 18 being connected together at the centre line 16 of the blanket 10 to define a flexible joint 19 therebetween, about which the blanket 10 articulates. The flexible joint 19 extends to a position 20, 20' to each side of the centre line 16, which position 20, 20' is 20 cm from the centre line 16.

The front and rear sections 17, 18, in each side 21, 22 respectively of the blanket 10, are connected by an inverted pleat 23, 23' located between the position 20, 20' to each side of the centre line 16 and the side edges 14, 15 of the blanket 10. Each inverted pleat 23, 23' is expandable to allow lengthwise extension of the blanket 10 such that, in use, the front section 17 and the rear section 18 can move freely with respect to each other in response to movements of the horse. Each inverted pleat 23, 23' is covered by a reinforcing end piece 24, 24' at position 20, 20'.

The flexible joint 19 is positioned, in use, at a location to the rear of the horse's withers and between 2 to 6 cm behind where the pommel of a saddle would be properly positioned, and the position 20, 20' to each side of the centre line 16 will lie behind the horse's scapula.

The blanket 10 is of a padded construction filled with thermobonded fibre fill and has a concave neck portion 25, and a tail flap 26. A pair of surcingles 27, attached to one side 28 of the rear section 18, is connectable to a corresponding pair of buckles 29, attached to other side 30 of the rear section 18, for securing the rear section 18 under the belly of the horse.

Sides 31, 32 of the front section 17 are secured together respectively by a combination of VELCRO™ (hook-and-loop) fasteners 33, 34 and a known closure means 35, 36, more particularly closure means of the type described and claimed in European Patent No. 0 930 819 B1.

A pair of cut-outs 37, 38 in the side edges 14, 15 respectively of the blanket 10 overlie the hind legs of the horse in use, as described in European Patent No. 1 469 718 B1.

The blanket is finished around its perimeter 39 with an edging 40.

Figure 2:
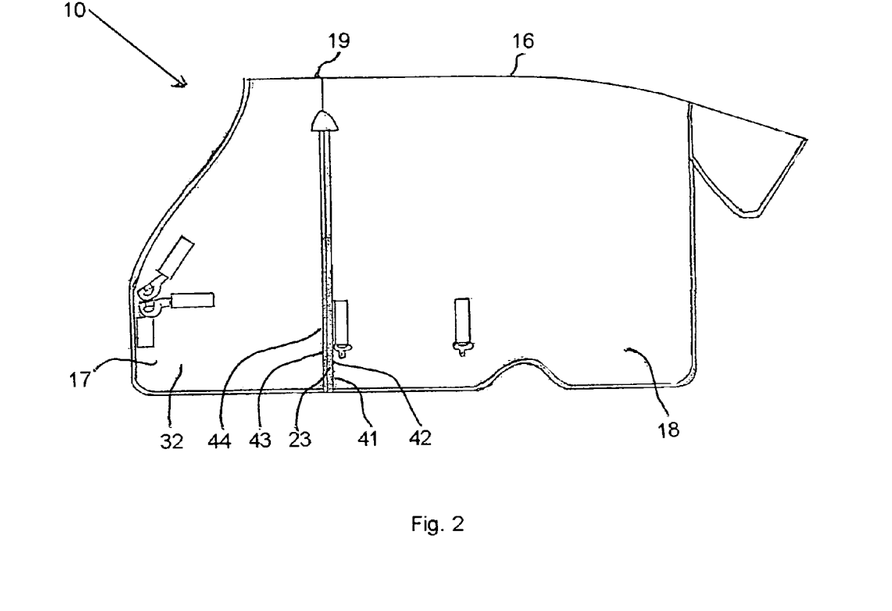
FIG. 2 is a side elevation of the horse blanket of FIG. 1 folded along the centre line thereof and with the inverted pleats in a closed position.

Referring to FIG. 2, the blanket 10 is illustrated folded along centre line 16 thereof with the inverted pleat 23 in a closed position. One side 41 of the inverted pleat 23 is attached to edge 42 of the rear section 18 and other side 43 of the inverted pleat 23 is attached to edge 44 of side 32 of the front section 17. The same arrangement applies to the other side of the blanket 10.

Figure 3:
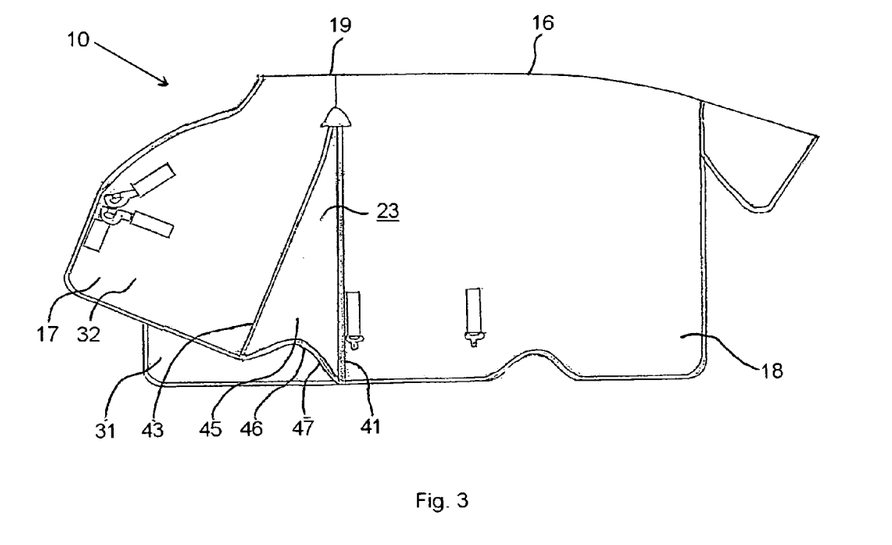
FIG. 3 is a side elevation of the horse blanket of FIG. 1 folded along the centre line thereof and with one inverted pleat in a fully extended position.

Referring to FIG. 3, the blanket 10 is illustrated with the inverted pleat 23 in a fully extended position. In practice the inverted pleat 23 would not be caused to extend fully. A triangular piece of loose material 45 bridges the sides 41, 43 of the inverted pleat 23 and includes a cut-out 46 in the lower edge 47 thereof.

Figure 4:
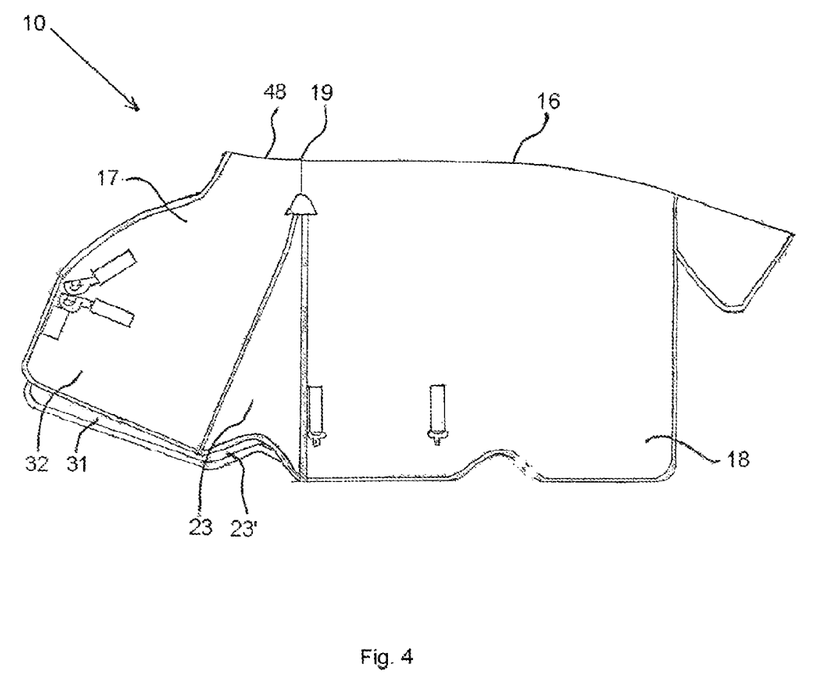
FIG. 4 is a side elevation of the horse blanket of FIG. 1 folded along the centre line thereof and with both inverted pleats in extended positions.

Referring to FIG. 4, the blanket 10 is illustrated with both pleats 23, 23' in extended positions, with the pleat 23' on side 31 of the front section 17 being extended less than the pleat 23 on side 32 of front section 17.

Since both of the pleats 23, 23' are extended, the front section 17 is shown in a raised position relative to the rear section 18. The raising of the front section 17 is facilitated by the flexible joint 19. This raising of the front section 17 results in the centre line 16 exhibiting an upwardly curved section 48 to the front of flexible joint 19. This has the effect that, in use, if the horse raises its head the front section 17 of the blanket 10 will ride up over the withers and rubbing will not occur in this area.

Figure 5:
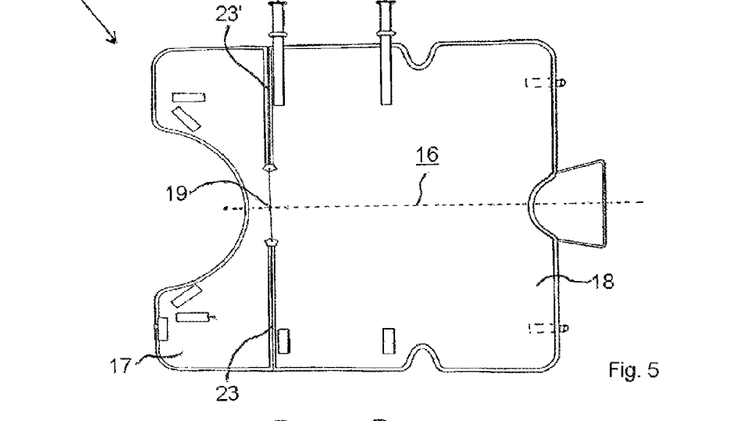
FIG. 5 is a simplified plan view, from above, of the horse blanket of FIG. 1.

Referring to FIG. 5, the blanket 10 is illustrated with both pleats 23, 23' in the closed position, which would be the situation where, in use, the horse would be in a square halt position. The front section 17 is aligned with the rear section 18 and the centre line is straight from front to rear.

Figure 6:
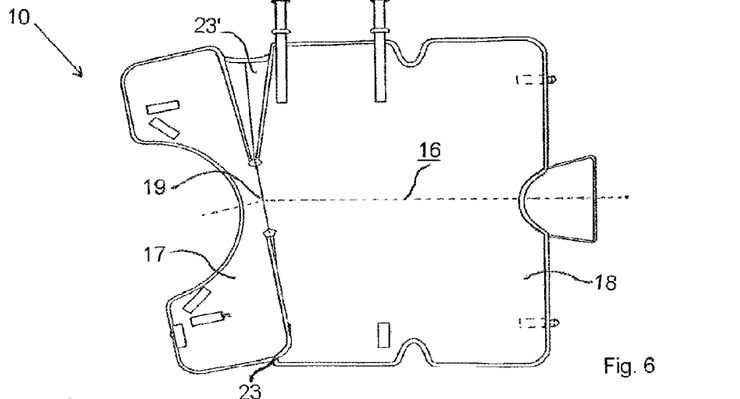
FIG. 6 is a plan view, from above, of the horse blanket of FIG. 5 with the front section bending to the left.

Referring to FIG. 6, the blanket 10 is illustrated with pleat 23 closed over on itself and pleat 23' in an open position, which would be the situation where, in use, the horse is bending to the left. The front section 17 has twisted to the left due to the bending movement of the horse and the centre line is showing a bend to the left where it passes through the flexible joint 19. This illustrates how the flexible joint 19 facilitates lateral bending movements of the horse.

Figure 7:
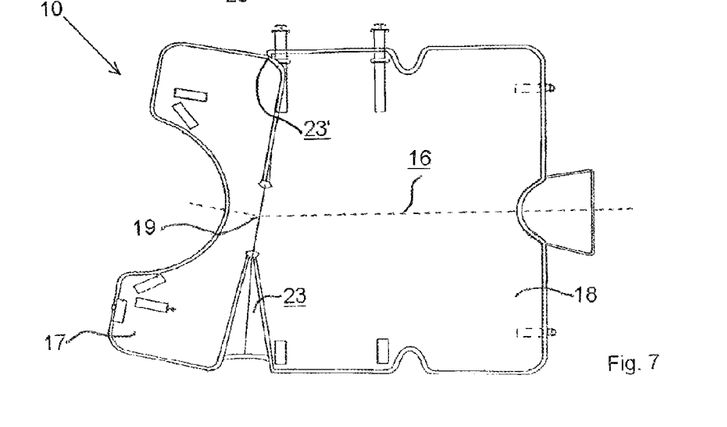
FIG. 7 is a plan view, from above of the horse blanket of FIG. 5 with the front section bending to the right.

Referring to FIG. 7, the blanket 10 is illustrated with pleat 23' closed over on itself and pleat 23 in an open position, which would be the situation where, in use, the horse is bending to the right. The front section 17 has twisted to the right due to the bending movement of the horse and the centre line is showing a bend to the right where it passes through the flexible joint 19. As with FIG. 6 this illustrates how the flexible joint 19 facilitates lateral bending movements of the horse.

Figure 8:
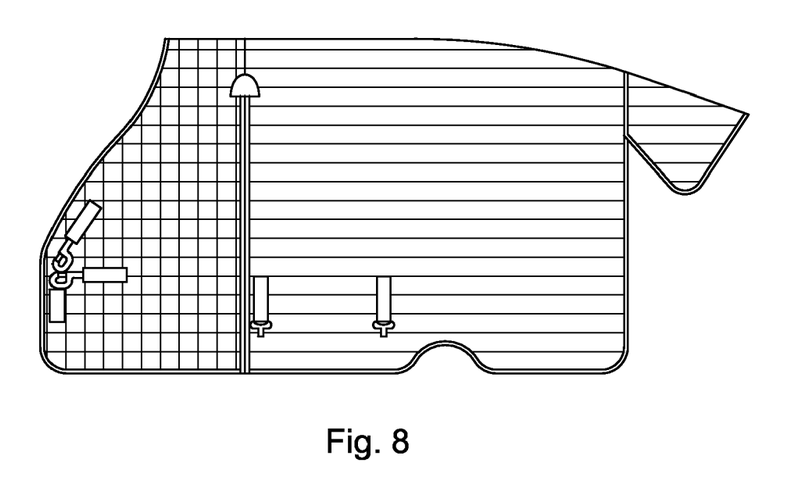
FIG. 8 is a side elevation of the horse blanket of FIG. 1 folded along the centre line thereof and with the inverted pleats in a closed position, which shows optional contrasting colours for front section and rear section.
Figure 9:
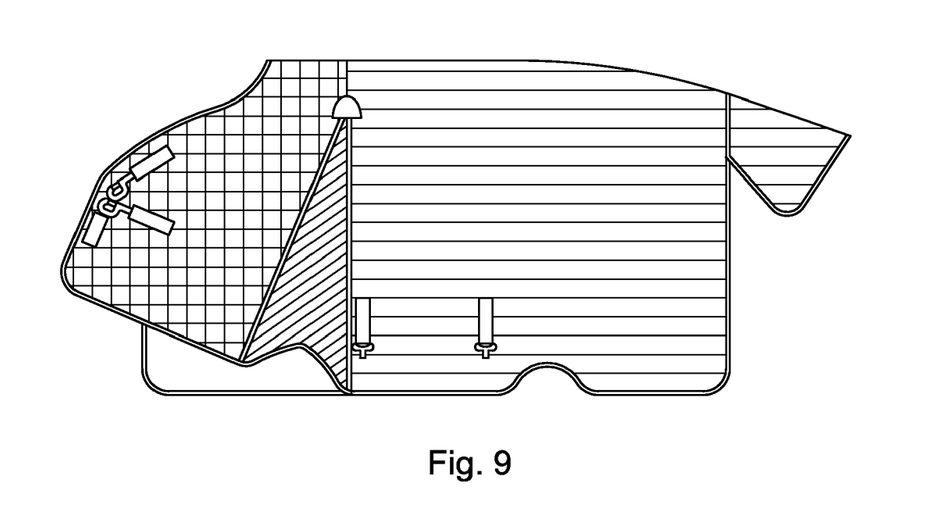
FIG. 9 is a side elevation of the horse blanket of FIG. 1 folded along the centre line thereof and with one inverted pleat in a fully extended position, which shows optional contrasting colours for front section, rear section and inverted pleat (it is noted that any two or all three of the front section, rear section and inverted pleat made be made with contrasting colours)
Figure 10:
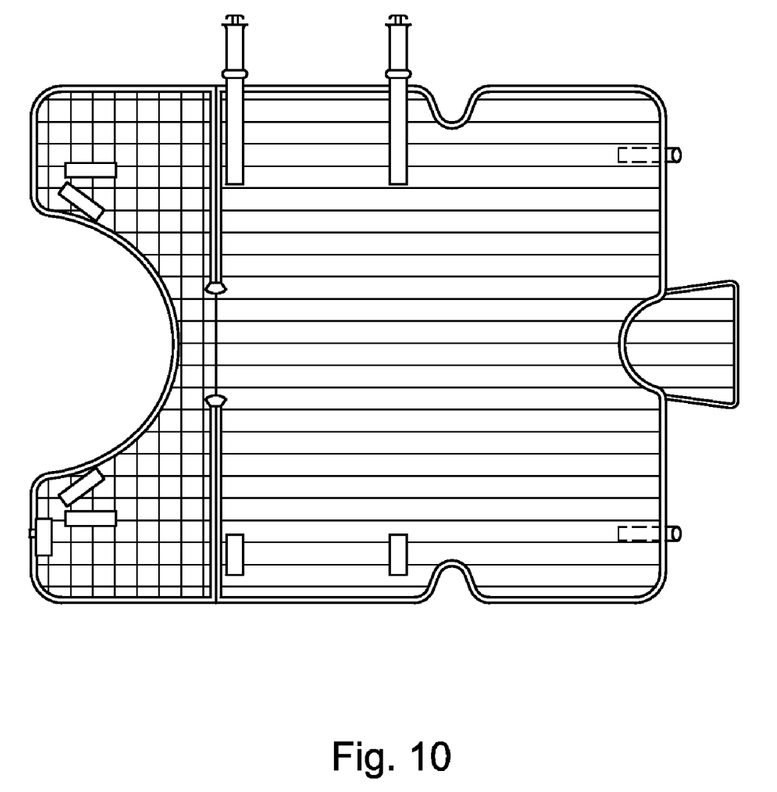
FIG. 10 is a simplified plan view, from above, of the horse blanket of FIG. 1, which shows optional contrasting colours for front section and rear sections.

Referring to FIGS. 8-10 is may be seen that for design purposes the blanket 10 maybe considered to be divided into three main sections: the front section; the rear section and the inverted pleat. Each of these sections may be of the same or contrasting colours. FIGS. 8-10 have been shaded to show the possible sections of contrasting colour. For example, the front section and inverted pleat may be of a first colour and the rear section may be of a second contrasting colour. Alternatively, the first section may be of a first colour and the rear section and inverted pleat may be of a second contrasting colour; the front and rear sections may be of a first colour and the inverted pleat of a second contrasting colour; each of the three sections may be of same colour; or each of the three sections may be of a different contrasting colour. In addition, the edging of the blanket may be of a fourth contrasting colour or may match the colour used for any of the front section, rear section and/or inverted pleat. The selection of the colours used for each section is not limited.

Referring to all the figures it will be appreciated that in use, one or both of the inverted pleats 23, 23' may extend to a greater or lesser extent, or fold back on itself, in response to the movements of the horse, while the rear section 18 remains securely in position over the back of the horse due to the arrangement of the surcingles 27. Furthermore, due to the flexible joint 19, up and down movements, side to side movements, as well as twisting movements of the front section 17 relative to the rear section 18 are facilitated.

Figure 11:
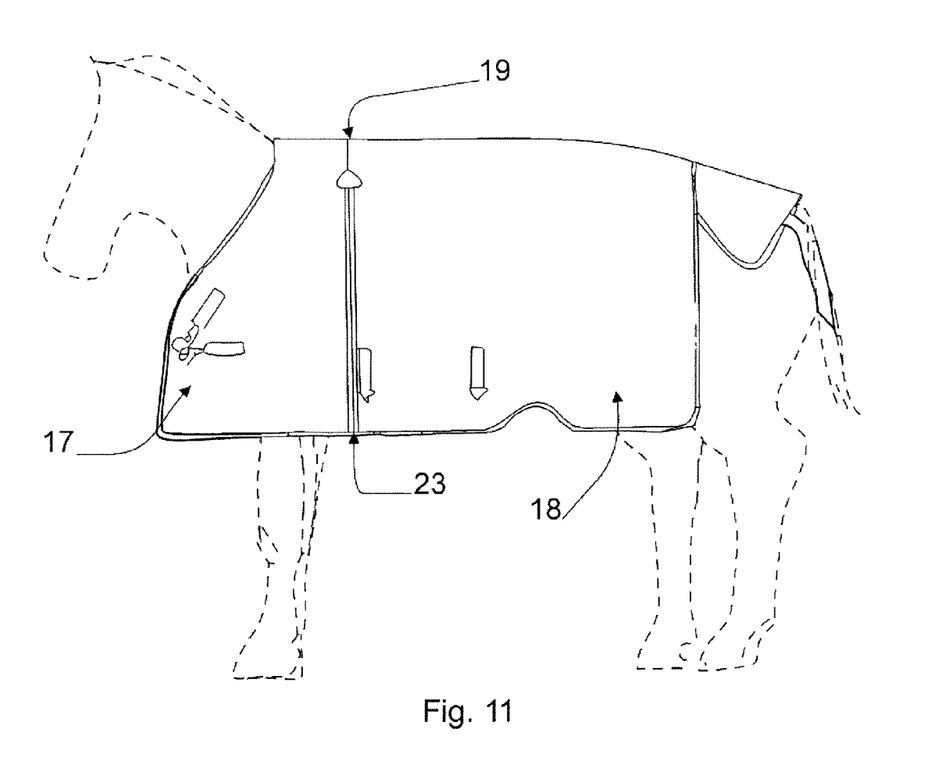
FIG. 11 is a side elevation of the horse blanket of FIG. 1 showing the positioning of the inverted pleats in a closed position with the horse at a square halt. The horse blanket is shown unlatched.

Referring to FIG. 11, there is illustrated the positioning of the horse blanket on a horse in the square halt position. As shown in FIG. 11, the flexible joint 19 and inverted pleats 23 are positioned to the rear of the concave neck portion and the withers of the horse. The horse blanket of FIG. 11 is shown unlatched at the neck and belly.

Figure 12:
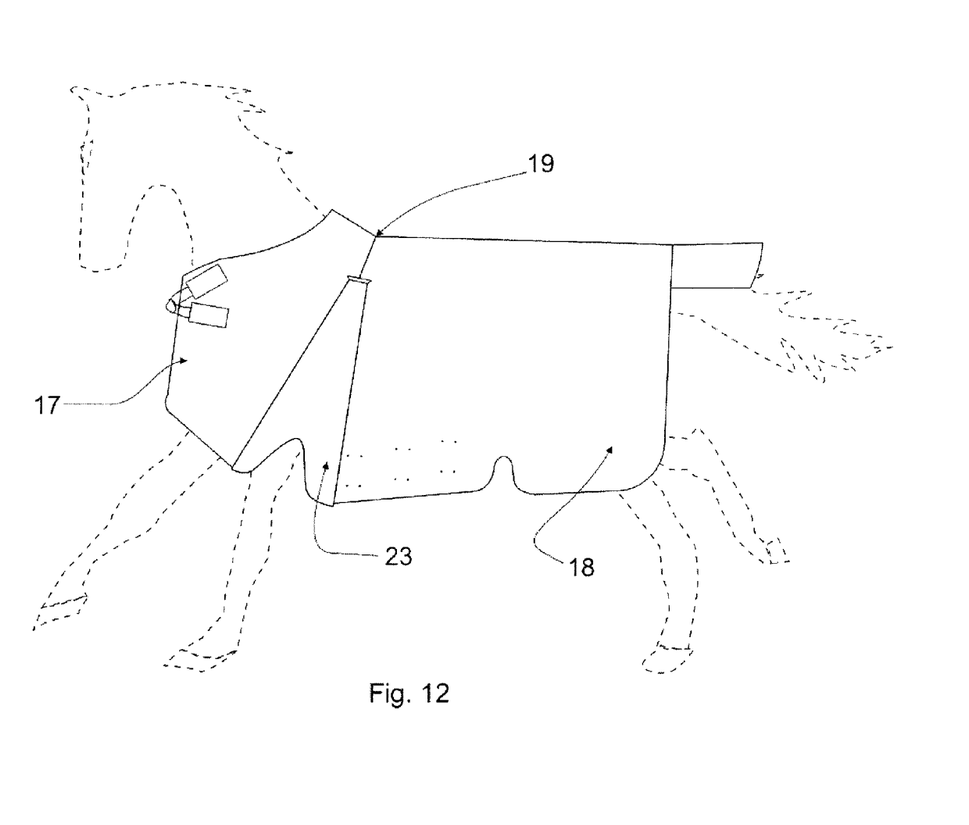
FIG. 12 is a side elevation of the horse blanket of FIG. 1 showing the articulation of the front section relative to the rear section.

Referring to FIG. 12, there is illustrated the positioning of the horse blanket on a horse in motion. When the horse is in motion the inverted pleats 23 expand so as to allow articulation of the front section 17 independently of the rear section 18 through the flexible joint 19.

The invention claimed is:

1. A horse blanket allowing freer movement of a horse in use, the blanket comprising
a generally rectangular piece of material with a front edge, a rear edge and two side edges,
the blanket being split behind a concave neck portion from each side edge to a longitudinal center line thereof, into a front section and a rear section, the front and rear sections being connected together at the longitudinal center line of the blanket to define a flexible joint therebetween, which spans from side edge to side edge and about which the front section articulates relative to the rear section, the flexible joint being positioned, in use, at a location behind the horse's withers and between 2 to 6 centimeters behind where a pommel of a saddle would be properly positioned, such that the front section and the rear section can move relative to one another about the flexible joint in response to movements of the horse.

2. The horse blanket according to claim 1, wherein the flexible joint extends to a position to each side of the longitudinal center line in a range of between 10 to 40 centimeters therefrom.

3. The horse blanket according to claim 2, wherein the position to each side of the longitudinal center line lies behind the scapula of the horse in use.

4. The horse blanket according to claim 2 or 3, wherein the front and rear sections, on each side of the blanket, are connected by a loose piece of material between the position to each side of the longitudinal center line and each side edge of the blanket, the dimensions of the loose piece of material being such that any relative movement of the front and rear sections is not impeded.

5. The horse blanket according to claim 4, wherein each loose piece of material is in the form of an inverted pleat.

6. The horse blanket according to claim 5, wherein each inverted pleat is triangular and tapers from one of the side edges to a point adjacent the longitudinal center line.

7. The horse blanket according to claim 6, wherein one side of the triangular inverted pleat is attached to the rear section and is generally perpendicular to a side edge of the blanket, and a second side of the triangular inverted pleat is attached to the front section and in use is movable away from the side of the triangular inverted pleat attached to the rear section to provide lengthwise extension of the blanket.

8. The horse blanket according to any one of claims 1 to 3, wherein the front section to each side of the blanket below the flexible joint overlaps the rear section, or vice versa.

9. The horse blanket according to claim 1, wherein the rear section is wrappable under the belly of the horse and is secured thereunder by a plurality of surcingles.

10. The horse blanket according to claim 1, wherein the rear section extends further from the longitudinal center line than the front section.

11. The horse blanket according to claim 1, wherein the front and rear sections are manufactured separately and are subsequently joined together to form the flexible joint.

* * * * *